United States Patent

[11] 3,558,808

[72] Inventor Hiromichi Kurokawa
Yokohama-shi, Japan
[21] Appl. No. 735,218
[22] Filed June 7, 1968
[45] Patented Jan. 26, 1971
[73] Assignee Sony Corporation
Tokyo, Japan
a corporation of Japan
[32] Priority June 10, 1967
[33] Japan
[31] 42/37057

[54] COLOR VIDEO SIGNAL GENERATING APPARATUS

18 Claims, 11 Drawing Figs.

[52] U.S. Cl. .......... 178/5.4
[51] Int. Cl. .......... H04n 9/06, H04n 9/22
[50] Field of Search .......... 178/5.4(STC), 5.4(F), 5.4(H)

[56] References Cited
UNITED STATES PATENTS

| | | | |
|---|---|---|---|
| 2,705,258 | 3/1955 | Lesti .......... | 178/5.4STC |
| 2,917,574 | 12/1959 | Toulon .......... | 178/5.4F |
| 3,301,944 | 1/1967 | Cornelissen et al. .......... | 178/5.4F |
| 3,443,139 | 5/1969 | Thompson .......... | 178/5.4F |
| 2,922,837 | 1/1960 | Boothroyd et al. .......... | 178/5.4F |

*Primary Examiner*—Robert L. Griffin
*Assistant Examiner*—Barry Leibowitz
*Attorneys*—Albert C. Johnston, Robert E. Isner, Lewis H. Eslinger and Alvin Sinderbrand

ABSTRACT: In a color video signal generating apparatus in which a filter having regions respectively selecting light of different wavelength ranges and a screen having separating lenses are optically interposed between an object to be televised and a single image pickup tube to cause such separating lenses to coact with the filter in dividing an image of the object into color components which are projected onto said tube in such manner that said color components can respectively become chrominance signals of the same frequency band in the electrical output of the tube which is composed of successive signals corresponding to the intensities of light successively encountered in a line scanning direction, index image forming means are provided to form on the image pickup tube index images which, when successively encountered in said line scanning direction, produce in said output an amplitude modulated index signal having a higher carrier frequency and a different frequency band than the chrominance signals, and the positions of the color components in the chrominance signals are indicated by such index signals to permit the extraction from said output of color video signals.

INVENTOR.
HIROMICHI KUROKAWA
BY
Lewis H. Eslinger
ATTORNEY

INVENTOR.
HIROMICHI KUROKAWA
BY
Lewis H. Eslinger
ATTORNEY

COLOR VIDEO SIGNAL GENERATING APPARATUS

This invention relates to color video signal generating apparatus and, more particularly, to color video signal generating apparatus which provide a plurality of color component images on image pickup means.

In the color video signal generating apparatus of the prior art, it is generally found that color component signals are provided wit which are representative of chrominance signals having different frequency bands. As a result, the passage of such color component signals through extraction circuit means comprising circuit components in the nature of amplifiers, or the like, which have distinct frequency response curves, can result in the said color component signals being effected to different degrees by the said extraction circuit components to thereby destroy the white balance of the displayed color picture. Further, in prior art apparatus wherein it is attempted to provide color component signals representing chrominance signals having the same frequency band, it then becomes necessary to provide one or more standard in or index signals to indicate the position of the color components of the said chrominance signal, and this may be under stood to lead to difficulty in the formation of the index signal at a frequency band which will not adversely limit the available frequency band areas for the luminance and chrominance signals to prevent sufficient broadening of the latter. An additional difficult resides in the possibility that an image of the index signal may appear in the picture displayed to thus render the latter obviously unsatisfactory. Too, in such instances, it is also essential that the frequency band of the modulated index generating signal be an integral number of times as large as the frequency of the index signal.

It is, accordingly, an object of this invention to provide color video signal generating apparatus wherein each color component signal is formed within the same frequency band and arranged to become a chrominance signal whereby color pictures having satisfactory white balance will be obtained.

Another object of this invention is to provide color video signal generating apparatus comprising means to generate an amplitude modulated index signal, which may thus be more easily demodulated, ad and which index signal has a higher carrier frequency and a different frequency band, respectively, than the chrominance signal to prevent adverse influence of the said index signal on the said chrominance signal.

Another object of this invention is to provide color video signal generating apparatus wherein the frequency bands of the respective luminance and chrominance signal are of relatively large band width.

Another object of this invention is to provide a color television camera wherein is employed only a single vidicon tube, and which may be of small size and of relatively low cost of manufacture.

Still another object of this invention is the provision of a color television camera providing for the display of color pictures of high resolution and wherein display of the image of the index signal in the color picture is prevented even when an image pickup tube with a relatively low upper frequency limit is employed.

As disclosed herein, the invention is applied to a color signal generating apparatus comprising image pickup means having scanning means and being operative to photoelectrically convert light projected thereon into electrical output composed of successive signals corresponding to the intensities of light successively encountered by the scanning means. Filter means are interposed optically between an object to be televised and the image pickup means, and the filter means comprise a plurality of filter regions which are operative, respectively, to select light of different wavelength ranges. A screen is interposed between the filter means and the image pickup means, and the screen coacts with light from the filter means in dividing an image of the object into respective color components which are projected onto the image pickup means in such manner that each of the color components becomes a color signal having the same frequency band as the other color signals. In accordance with this invention, apparatus as generally described above is provided with index image forming means for forming stripelike index images on the image pickup means to provide in the output thereof amplitude modulated index signals which have a higher carrier frequency and a different frequency band than the chrominance signals. Extraction circuit means are provided which employ the index signals for differentiating between the color signals corresponding to the respective color components, thereby to extract color video signals from the output of the latter.

In accordance with a feature of this invention, the said screen comprises spaced separating lenses which coact with the said filter means for dividing an image of the object into respective color components which are projected onto the said image pickup means, and nonseparating portions which are disposed between the said separating lenses and through which a panchromatic image of the object is projected on the said image pickup means in overlapping relationship with said color components to thereby result in the provision of luminance signals corresponding to said panchromatic image.

In accordance with another feature of this invention, means for forming an index image are formed integrally with said filter means in predetermined relationship with the latter, and said index image forming means comprise transparent regions and nontransparent regions which are alternately arranged in adjacent relationship and which undergo gradual changes in the respective dimensions thereof extending at right angles to the line scanning direction, whereby signals corresponding to the black and white image formed on the image pickup means by the light passing through said transparent regions will provide the amplitude-modulated index signal.

In accordance with another feature of this invention, the color video signal extraction circuit means comprise band pass filters which receive the image pickup means output and respectively pass signals of different frequency ranges to separate the said output into at least the chrominance and index signals.

In accordance with still another feature of this invention, the selective filter regions are of substantially equal width and are disposed in side-by-side relationship in the line scanning direction, and the selective filter regions which select one color component occur in the filter with the same frequency as that of the selective filter regions to select other color components, whereby the said color components will be provided within the same frequency band to in turn more readily provide the chrominance signal.

The above and other objects and advantages of this invention are believed made clear by the following detailed description thereof taken in conjunction with the accompanying drawings wherein.

Figure 1:
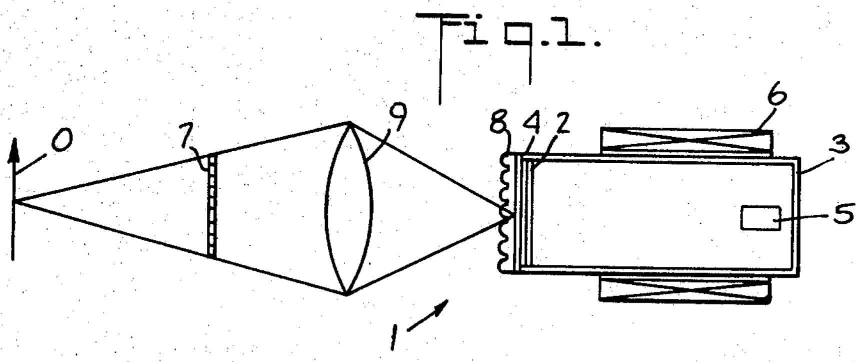
FIG. 1 is a schematic top view illustrating a color video signal generating apparatus constructed in accordance with the principles of my copending application for United States Patent as identified hereinbelow.

Referring now to FIG. 1 of the drawings, apparatus for generating color video signals constructed in accordance with the principles of my copending application for Ser. No. 734,387 filed June 4, 1968now U.S., Pat. No. 3,520,339 and assigned to the assignee hereof, are indicated generally at 1. Briefly described, for purposes of providing a clearer background for the description of this invention, the apparatus 1 comprise a single image pickup tube 3 in the nature, for example, of a vidicon tube, a color filter 7, a camera or objective lens 9, and a lens screen 8, relatively disposed as shown.

The image pickup tube 3 includes a transparent electrode 4, the inner surface of which is coated with a photoconductive layer 2 formed, for example, of PbO. Electron gun means 5 are disposed as shown adjacent the end of the image pickup tube 3 remote from the photoconductive layer 2 and function to emit an electron beam which is focused on the said photoconductive layer and is caused to scan the surface of the latter by operation of electron beam deflection means is indicated at 6.

Conventional, nonillustrated electronic circuit components, which form no part of this invention, are connected to the electron beam scanning means 6 in the usual manner to effect the electron beam scanning of the photoconductive layer 2 by horizontally oscillating the electron beam and successively vertically displacing the beam between its successive oscillations so that the entire useful area of the photoconductive layer 2 is cyclically covered by a series of the successive horizontal beam oscillations. As a result of this scanning, the electrical output from the electrode 4 will be composed of sequential signals which represent the object, as indicated at 0, to be televised.

The color filter 7 is disposed as shown at a predetermined distance from the photoconductive layer 2 with the respective surfaces thereof being substantially parallel.

Figure 3:
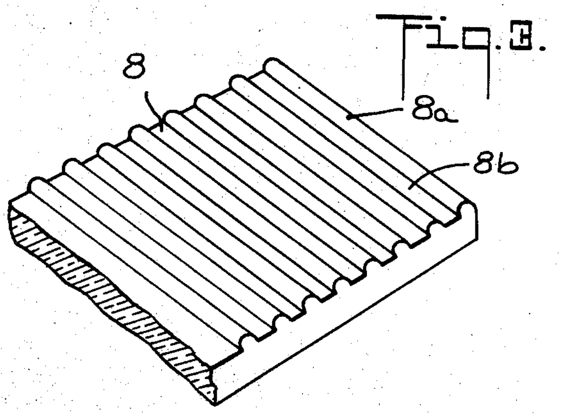
FIG. 3 is a perspective view schematically illustrating a lens screen employed in the apparatus of FIG. 1.

The lens screen 8 comprises an assembly of cylindrical lenses 8*a*, commonly referred to as "lenticultes," and arranged as best seen in FIG. 3 at regularly spaced intervals with the longitudinal axes thereof being substantially parallel. The lens screen 8 may be formed as an integral member by properly molding the cylindrical lenses 8*a* as a unit from any suitable material in the nature, for example, of glass, acrylic resin, or the like. The thusly formed lens screen 8 is secured to the front surface of the image pickup tube 3 by a suitable adhesive binder and is so disposed relative to the said front surface so that the respective longitudinal axes of the cylindrical lenses 8*a* extend vertically, that is to say, at right angles, to the horizontal scanning direction of the electron beam on the photoconductive layer 2. Although it is, of course, possible to form the lenticules or cylindrical lenses 8*a* directly on the front surface of the image pickup tube 3, it may be understood, however, that such direct lens screen formation is not as feasible from a manufacturing point of view as is the arrangement described wherein the lens screen 8 is separately formed and secured as described above to the front surface of the image pickup tube 3.

Although depicted schematically as a simple, single lens element, the camera or objective lens 9 would, in practice be constituted by a multielement lens for achieving the desired optical performance characteristics. As utilized in practice, the camera lens 9 functions to focus a real image of the object 0 which is to be televised on the photoconductive layer 2, and photographic tests are normally employed to determine the optimum focusing position for the camera lens 9 relative to the said photoconductive layer.

As best seen in FIG. 3, the lens screen 8 further comprises generally flat, nonlens portions 8*b* which space the cylindrical lens 8*a* and through which panchromatic images of the object O are focused on the photoconductive layer 2 so as to be overlapped by the separated color images of the object O projected on the former by the cylindrical lens 8*a*. The thusly projected, separated color images are such that the image of the object O is separated into stripelike image elements in particular patterns of intensity in accordance with the colors at the respective positions on the object, and it may be understood that the separated color images are of lower resolution in the line scanning direction than are the thusly projected panchromatic images. However, since the acuity of the human eye for color changes is lower than for luminance changes, the color video signal that is obtained is of high resolution. The respective sura surfaces of the flat portions 8*b* may be formed from ground glass or may, alternatively, be arranged so that the incident light passing therethrough from the object O to be televised may be spread and projected over the photoconductive layer 2. This will result in slight blurring of the object image to thus block the higher frequency band components of the luminance signal.

Figure 2:
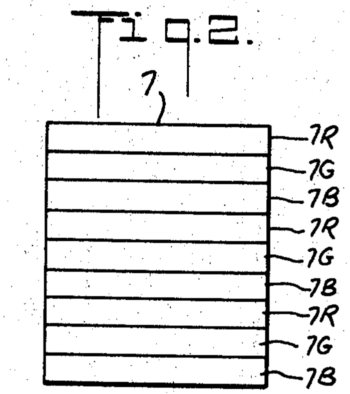
FIG. 2 is a schematic diagram illustrating the color filter employed in the apparatus of FIG. 1.

As seen in FIG. 2, the color filter 7 comprises alternate stripelike red, green, and blue filter regions as indicated at 7R, 7G and &B, respectively, these being three of each of said filter regions. The red color filter regions 7R permit primarily the passage of red color light therethrough, while the green filter regions 7G primarily permit the passage of green-colored light therethrough, and the blue color filter regions 7B primarily permit the passage of blue colored light therethrough. The respective color filter regions 7R, 7G and 7B are of substantially equal width and are arranged in the depicted side-by-side manner to extend in substantially the same longitudinal directions as do the respective cylindrical lenses 8*a* and flat portions 8*b* of the lens screen 8.

If the focal length of the camera lens 9 is F, the focal length of each of the cylindrical lenses 8*a* is F', the pitch of each cylindrical lens 8*a*, that is to say, the distance between the centers of an adjacent pair of the said cylindrical lenses, is taken as D', and the width of the color filter 7 is taken as D, the relationship $$\frac{D'}{D}=\frac{F'}{F}$$

will result.

Figures 4, 5:
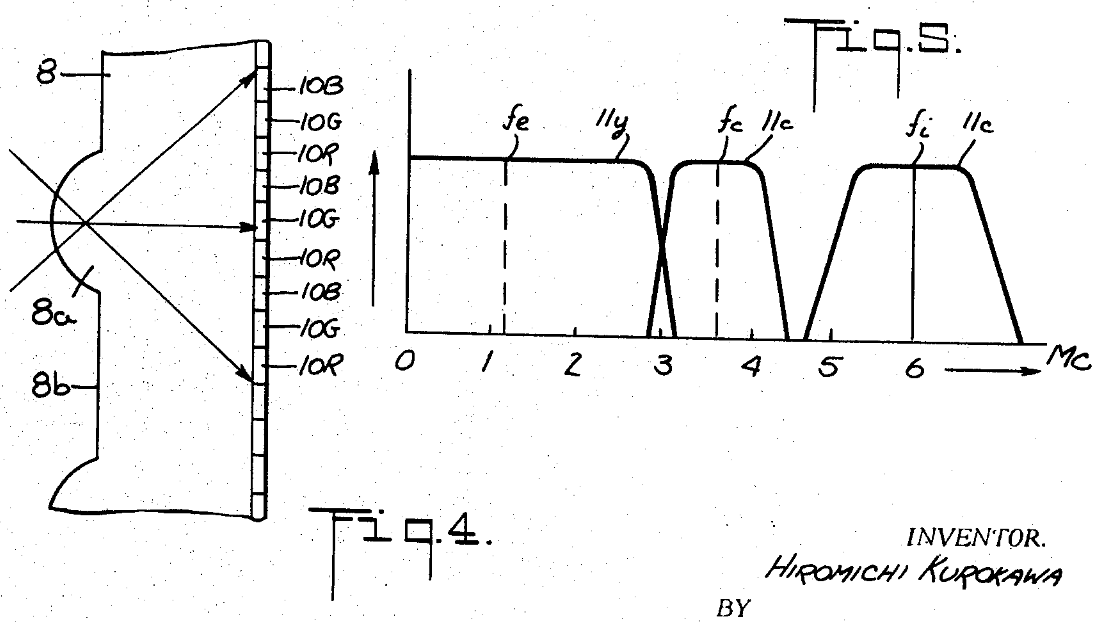
FIG. 4 is a schematic diagram illustrating the manner in which color separation is effected by the lens screen of FIG. 3 and the color filter of FIG. 2.
FIG. 5 is a diagram showing the frequency specter of the color video signals produced by the apparatus of this invention.

With the thusly described construction, it may be understood that, as seen in FIG. 4, a real image 10 of the color filter 7 will be successively formed on the photoconductive layer 2 for each of the cylindrical lenses 8*a*. As a result, each part of the object O is resolved into a striplike image for each of the cylindrical lenses 8*a*, and each part of the object O thus resolved is further resolved into stripes by the color filter elements which extend in the longitudinal direction of the already received stripes. More specifically, the image of the color filter 7 passing through each cylindrical lens 8*a* is projected on the photconductive layer 2 at a stripelike area which extends at right angles to the longitudinal axis of the said lens 8*a* as seen in FIG. 4. That is to say that the incident light passing through each cylindrical lens 8*a* from the object O is separated into color components by the color filter 7 and projected onto a corresponding area of the photoconductive layer 2. Thus, for the color filter 7 of FIG. 2, it may be understood that the red color component of the incident light passes primarily through the three red colorfilter elements 7R, so that three color filter images 10R are formed by each cylindrical lens 8*a* on the photoconductive layer 2. In like manner, the green color component of the incident light passes primarily through the three green color filter elements 7G, so that three color images 10G thereof are formed by each cylindrical lens 8*a* on the photoconductive layer 2, while the passage of the blue color component of the incident light primarily through the three blue color filter regions 7B will result in the formation of three color images 10B per lens 8a on the photoconductive layer 2.

As a result, when the photoconductive layer 2 upon which the thusly resolved color images have been formed as discussed above, is scanned by the electron beam in such manner that the line scanning direction is at right angles with respect to the longitudinal axes of the cylindrical lenses 8a, color video signals will be produced at the electrode 4. As seen in FIG. 5, this color video signal will consist of the chrominance signal as indicated at 11c, and the luminance signal as indicated at 11y, it being understood that the use of the color filter 7 will not provide an index signal in this color video signal.

If the lens frequency f1, which indicates the product of the number of the cylindrical lenses 8a, or the number of the flat portions 8b and the line scanning frequency of the electron beam, is, for example, 1.2 mc., the chrominance signal 11c will result in a color subcarrier frequency fc of 1.2 mc. × 3 or 3.6 mc., as modulated by each color component signal, because each of the component images 10R, 10G and 10B is successively formed three times for each of the cylindrical lenses 8a as discussed hereinabove.

In addition, it may be understood that by forming the flat portions 8b of the lens screen 8 from ground glass, or by setting the camera lens 9 in a slightly defocused condition, the high frequency band components of the luminance signal 11y as obtained by the flat lens screen portions 8b will fall below the frequency band of the chrominance signal 11c.

Figure 6:
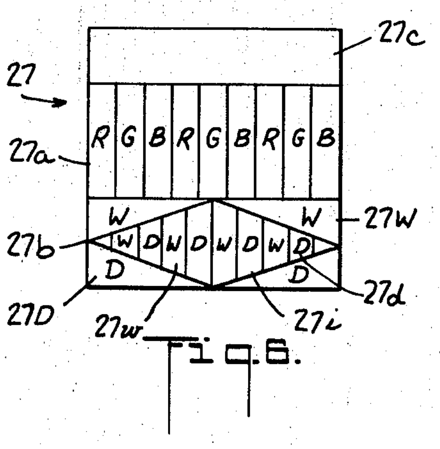
FIG. 6 is a schematic diagram illustrating a first embodiment of a color filter constructed in accordance with the principles of this invention an includes the depiction of index image forming means which are integral therewith.
Figures 8, 9:
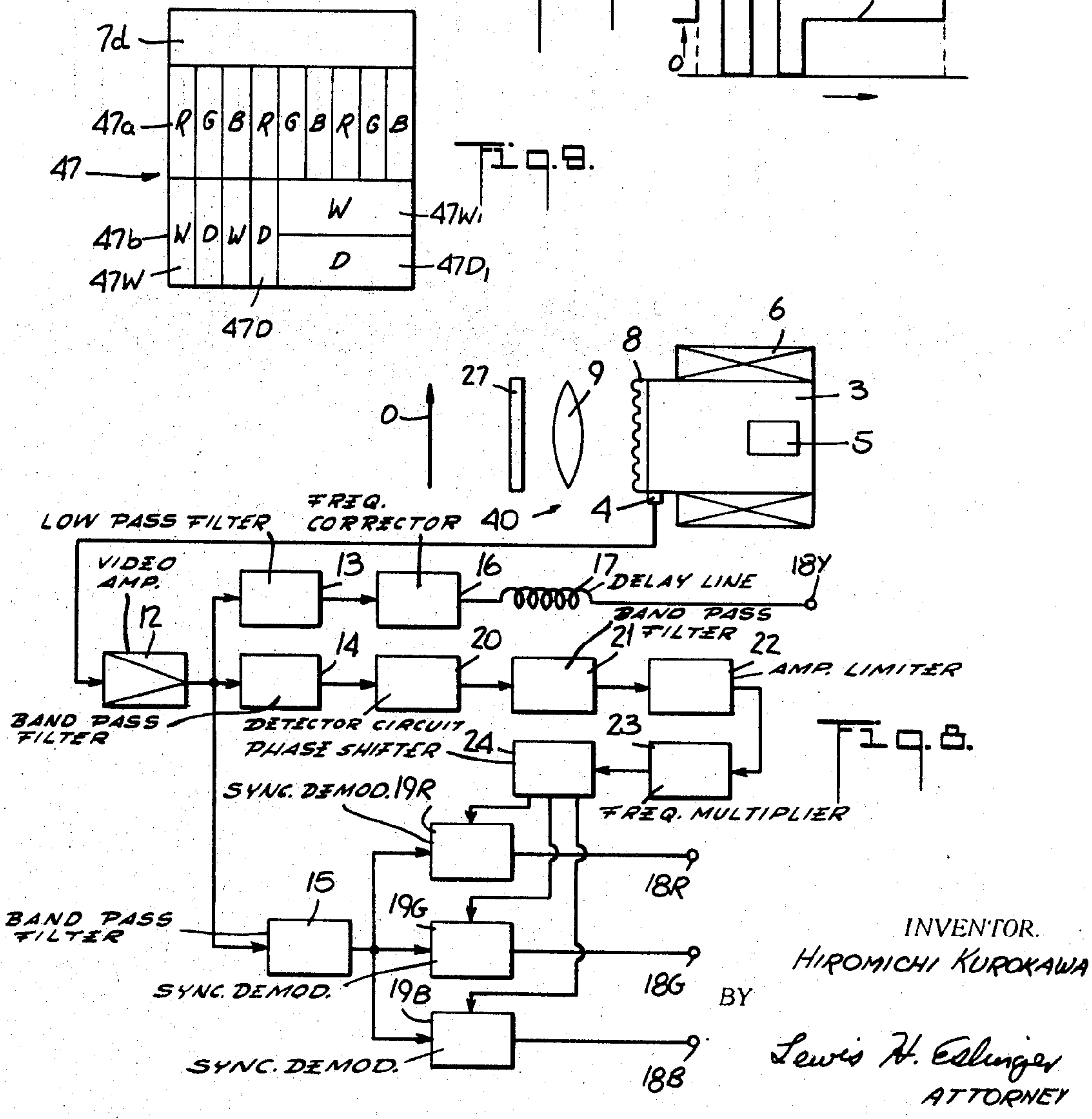
FIG. 8 is a schematic top view illustrating a color video signal generating apparatus constructed in accordance with the principles of this invention.
FIG. 9 is a schematic diagram illustrating a second embodiment of a color filter constructed in accordance with the principles of this invention and includes the depiction of index image forming means which are integral therewith.

Referring now to FIG. 6, the color filter for use in the apparatus of this invention, as depicted in FIG. 8, is indicated at 27 and comprises a color separating portion 27a which is formed in much the same manner as the color filter 7 of FIG. 2 in that the former may be seen to include alternate red, green and blue color filter elements arranged as discussed hereinabove.

The color filter 27 also includes a stripelike color corrective portion 27c which is disposed as shown to extend longitudinally at right angles with the respective longitudinal directions of the color filter regions 27R, 27G and 27B, with the said color corrective portion being in contact with corresponding extremities of the said color filter regions.

To provide index image forming means for the generation of an index signal to indicated the position of a color component to be selected, the color filter 27 may be also be seen to comprise an index image forming portion 27b which comprises a generally diamond-shaped index filter portion 27i for producing an amplitude modulated index signal. The filter portion 27i is constituted by stripelike transparent regions 27w and stripelike nontransparent or opaque regions 27d which are successively arranged as shown in side-by-side relationship. Generally triangular-shaped transparent regions 27W and generally triangular-shaped nontransparent or opaque regions 27D are also provided in the index image forming portion 27b and are arranged as shown relative to the regions 27w and 27d to form the boundaries of the portion 27b.

Figures 7A, 7B, 7C:
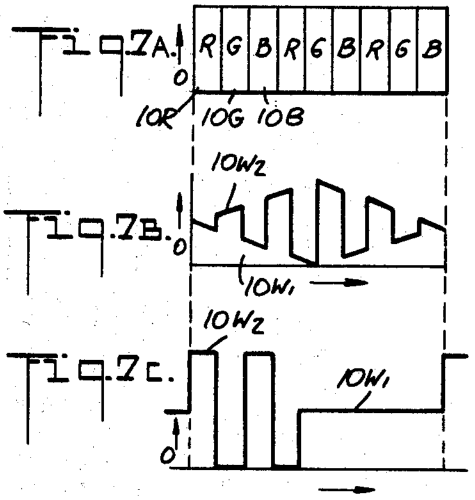
FIG. 7A is a schematic diagram illustrating the distribution of the color component images formed on the image pickup means of the invention.
FIG. 7B is a schematic diagram illustrating the black and white index images formed on the image pickup means of this invention by the index image forming means of FIG. 6.
FIG. 7C is a schematic diagram illustrating the black and white index images formed on the image pickup means of this invention by the index image forming means of a second color filter embodiment of this invention.

The repetition of the respective transparent and nontransparent regions of the index image forming portion 27b provides a carrier from the index signal as illustrated by the index image $10W_1$ and $10W_2$ of FIG. 7B. The respective, stripelike transparent regions 27w and stripelike nontransparent regions 27d are arranged for gradual increase and then gradual decrease, as shown, in width in the direction taken across the index filter pr portion 27d whereby the index signal carrier will be amplitude modulated thereby. The degree of change in the respective transparent and on nontransparent region widths is kept relatively small so as to prevent the degree of modulation from becoming too large.

The center frequency or carrier frequency $f_i$ of the amplitude modulated index signal 11i (FIG. 5) to be provided by the color filter 27 is determined by the number of the respective transparent regions 27d, and the color filter 27 is arranged so that this center or carrier frequency $f_i$ will be 6 mc. to thereby provide a somewhat wider frequency band for the side bands of the amplitude modulated index signal.

With regard to the color corrective portion 27c of the color filter 27, it may be understood that the wavelength range of the light which will pass therethrough is selected so that the color components of the luminance signal 11y may be distributed at predetermined ratios.

The generally triangular transparent regions 7W and nontransparent regions 7D are arranged to provide a constant DC level for the index signal carrier and to provide for alternating reversal of the direction of change in amplitude of the index signal to either side of the said constant DC level. As a result, the frequency spectrum of the index signal, as indicated by 11i in FIG. 5, will be of lesser extent than the 6 mc. ± 1.2 mc. frequency range, e.g. the index signal frequency ± the lens frequency range, and the said frequency spectrum will not contain a lower frequency component which could effect reproduced picture deterioration.

With the use of the color filter 27 of FIG. 6 in the color video signal generating apparatus 40 of FIG. 8, and assuming the object 0 to represent a white color picture, it may be understood that in addition to the color component images 10R, 10G and 10B as seen in FIG. 7A, a bright black and white image $10W_1$ and $10W_2$ corresponding to each transparent region 27w of the index forming portion 27b of the filter 27 will be formed by each cylindrical lens 8a. Since the respective cylindrical lenses 8a will not act to refract the incident light in the longitudinal direction thereof, an image which overlaps the color component images 10R, 10G and 10B of FIG. 7A, and the black and white image $10W_1$ and $10W_2$ of FIG. 7B, will be formed on the photoconductive layer 2.

Electron beam scanning of the photoconductive layer 2 with the respective color component and black and white images formed thereon as discussed above, will result in the formation, at electrode 4, of repeated sequences of the luminance signal 11y and the chrominance signal 11c which is, of course, based upon the color component images 10R, 10G and 10B. Simultaneously, the index signal 11i which is based upon the black and white image $10W_1$ and $10W_2$ will be obtained in repeated sequence.

As discussed hereinabove, the index signal 11i is an amplitude modulated wave which provides for amplitude modulation of a carrier which is obtained from the aforementioned repetitive sequencing, as a frequency $f_i$ of 6 mc. through use of the signal wave which in turn has a frequency equal to the lens frequency $f_1$ of 1.2 mc. Too, FIG. 5 is believed to make clear that the frequency band of the index signal 11i falls well without the respective frequency bands of the chrominance signal 11c and the luminance signal 11y.

FIG. 5 is also believed to make clear that the carrier frequency $f_i$ of the index signal 11i is higher than the carrier frequency fc of the chrominance signal 11c, and that the frequency range between the respective frequency bands of the index and carrier signals is wider than in my said copending application for U.S. Patent as referred to hereinabove. This is desirable in this instance because, although the amplitude modulation of the index signal facilitates the subsequent demodulation thereof, it may be understood that the amplitude modulated index signal would be more prone to adversely influence the chrominance signal, or vice versa, upon overlapping of the respective frequency bands thereof, than would be the angle frequency modulated index signals of my said copending application.

FIG. 7A depicts the images of the color filter portion 27a as focused on the photoconductive layer 4 of one of the cylindrical lenses 8a, while FIG. 7B depicts the brightness of the images of the filter index image portion 27b as focused on the said photoconductive layer by one of the cylindrical lenses 8a, and it is to be understood that the respective images of FIG. 7A and FIG. 7B are, in practice, overlapped on the said photoconductive layer.

Referring now to the color video signal generating apparatus 40 constructed as depicted in FIG. 8, in accordance with the principles of this invention to include the color filter 27, it may be seen that the composite color video signal provided at the transparent electrode 4 of the image pickup tube 3, as discussed hereinabove, is initially fed to a video amplifier 12 for amplification by the latter. Therefrom, the amplified color video signal is supplied to low-pass filter means 13 which are provided to obtain the luminance signal 11*y* therefrom, and have a cutoff frequency, for example, of 4.5 mc. Simultaneously, the thusly amplified composite color video signal is supplied to band pass filter means 14 which are provided for deriving the modulated index signal 11*i* therefrom and have a band pass of 6 mc. ± 1.2 mc., and the thusly amplified composite color video signal is also applied to the band pass filter 15 which is provided to separate the chrominance signal 11*c* therefrom, and which has a band pass of 3.6 ± 0.7 mc.

The output of the low pass filter means 13 is applied in turn to a frequency corrective circuit 16 to equalize the frequency response of the luminance signal, and to a delay line 17 for adjusting the phase or time difference between the luminance signal and the demodulated chrominance signal, to thereby provide the luminance signal 11*y* as an output at terminal 18*y*.

The output of the band pass filter means 15 is applied as indicated to each of the synchronous demodulator circuit means 19R, 19G and 19B, while the output of the band pass filter means 14 is applied as indicated to demodulator or detection circuit means 20 for detecting the frequency envelope of the index signal. The output of the detector circuit means 20 is applied to band pass filter means 21 having a band pass of 1.2 mc. ± 40 kc. for deriving the standard signal of 1.2 mc.

This standard signal is applied as indicated to amplitude limiting means 22 and therefrom to frequency multiplier means 23 for providing a chrominance signal carrier at 3.6 mc. Therefrom, this carrier is applied as indicated to amplitude limiting means 22 and therefrom to frequency multiplier to phase shifting circuit means 24 for providing three carrier signals of respectively different phases, and the latter are applied as indicated to the synchronous demodulator circuit means 19R, 19G, and 19B to provide for demodulation of the chrominance signal. As a result, the color difference signal 6–R will be provided at the output terminal 18R, the color difference signal y–G will be provided at the output terminal 18G, and the color difference signal Y–B will be provided at the output terminal 18B.

Although as disclosed, the color difference signal Y–R and Y–G are provided from the demodulator circuit means 19R, 19G and 19B, it is to be understood that, in the alternative, red, green and blue color component signals may be provided by proper adjustment of the phase shifting circuit means 24 to effect different phase shifts for the respective carriers.

Referring now to FIG. 9, it may be seen that a second embodiment of a color filter constructed in accordance with the principles of this invention is indicated therein at 47. In the manner of the color filter 27 of FIG. 6, the color filter 47 comprises a stripelike color corrective portion 47*d*, a color separating portion 47*a*, and an index image forming portion 47*b*. The respective filter portions 47*d* and 47*a* are similar to the filter portions 27*c* and 27*a* of the color filter 27 of FIG. 6. In the color filter 47, however, the index image forming portion 47*b* is composed of alternate stripelike transparent portions 47W and stripelike nontransparent portions 47D which extend as shown, and semitransparent portions $47W_1$, and $47D_1$, which complete the index image forming portion. FIG. 7C depicts the image formed by the portion 47*b* of the color filter 47 on the photoconductive ayer 4, it being understood that the said image is again formed in overlapped relationship with image of FIG. 7A as discussed hereinabove.

The use of the color filter 47 enables the selection of an index signal carrier frequency which is not an integral multiple of the lens frequency $f_l$, whereby the former may be selected at 5.5 mc. This is made possible because the multiplied frequency signal, or the carrier to be demodulated, may readily be provided in synchronism with the rising or increasing portion of the index signal and need bear no fixed relationship to the index signal frequency.

It will be apparent that many modifications and variations in addition to those noted above may be effected in the described embodiment without departing from the spirit and scope of this invention as defined in the appended claims.

I claim:

1. A color video signal generating apparatus comprising image pickup means having scanning means and being operative to photoelectrically convert light projected onto said image pickup means into an electrical output composed of successive signals corresponding to the intensities of light successively encountered by the said scanning means in a line scanning direction, filter means interposed optically between an object to be televised and said image pickup means, said filter means having several regions respectively selecting light of different wavelength ranges, a screen of lenses interposed between said filter means and said image pickup means, said screen coacting with said filter means for dividing an image of the object into respective color components which are projected onto said image pickup means to produce in said output respective color component signals of the same frequency band, index image forming means for forming index images on said image pickup means which, when encountered in said line scanning direction, produce in said output amplitude modulated index signals having a frequency band which is different from the frequency band of said color component signals, and means employing said index signals to differentiate between said color component signals corresponding to the respective color components and being operative to extract the respective component color signals from the output of said image pickup means.

2. A color video signal generating apparatus as in claim 1, wherein said screen comprises spaced, separating lenses which coact with said filter means for dividing an image of the object into said respective color components, and nonseparating screen portions which are disposed between said separating lenses and through which a panchromatic image of the object is projected onto said image pickup means in overlapping relationship with said respective color components to provide luminance signals in said output.

3. A color video signal generating apparatus as in claim 1, wherein said index image forming means comprise a member having a generally diamond-shaped portion including stripelike transparent regions and nontransparent regions interposed optically between said object to be televised and said image pickup means, said transparent and nontransparent regions being arranged in alternating, side-by-side relationship and having their respective dimensions at right angles to said line scanning direction changing gradually in said line scanning direction whereby said amplitude modulated index signal will comprise signals corresponding to a black and white image of varying intensity formed on said image pickup means by light passing through said transparent regions.

4. A color video signal generating apparatus as in claim 3, wherein said index image forming means further comprise generally triangular-shaped transparent regions disposed to one side of said generally diamond-shaped portion, and generally triangular-shaped nontransparent regions disposed to the opposite side of said generally diamond-shaped portion whereby a constant DC level will be provided for the carrier of said index signals, and the direction of change in amplitude of said index signal will be alternately reversed to either side of said DC level.

5. A color video signal generating apparatus as in claim 4, wherein said index image forming means are formed integrally with said filter means.

6. A video signal generating apparatus as in claim 5, wherein said light-selective regions of said filter means are of equal width and are disposed in side-by-side relationship in said line scanning direction, and said regions to select light of one wavelength range occur in said filter means with the same frequency as said regions to select light of another wavelength range.

7. A color video signal generating apparatus as in claim 5, wherein said screen comprises spaced, separating lenses which coact with said filter means for dividing an image of the object into said respective color components, and nonseparating screen portions which are disposed between said separating lenses and through which a panchromatic image of the object is projected onto said image pickup means in overlapping relationship with said respective color components.

8. A color video signal generating apparatus as in claim 5, wherein there is no overlapping between said different frequency bands of said chrominance signal and aid amplitude modulated index signal.

9. A color video signal generating apparatus as in claim 1, wherein said means for extracting color video signals from the output of said image pickup means comprise band pass filter means for receiving said output and respectively passing signals of different frequency ranges to separate the said output into a plurality of signals.

10. A video signal generating apparatus as in claim 1, wherein said light-selective regions of said filter means are of equal width and are disposed in side-by-side relationship in said line scanning direction, and said regions to select light of one wavelength range occur in said filter means with the same frequency as said regions to select light of another wavelength range.

11. A color video signal generating apparatus as in claim 1, wherein said index image forming means comprise stripelike transparent and nontransparent regions arranged in alternating side-by-side relationship, and at least one semitransparent region disposed adjacent said first-mentioned regions.

12.

A color video signal generating apparatus as in claim 11, wherein said index image forming means are formed integrally with said filter means.

13. A color video signal generating apparatus as in claim 12, wherein said screen comprises spaced, separating lenses which coact with said filter means for dividing an image of the object into said respective color components, and nonseparating screen portions which are disposed between said separating lenses and through which a panchromatic image of the object is projected onto said image pickup means in overlapping relationship with said respective color components to provide a luminance signal in said output.

14. A color video signal generating apparatus as in claim 1, wherein there is no overlapping between said different frequency bands of said chrominance signal and said amplitude modulated index signal.

15. In a color video signal generating apparatus of the type including image pickup means having scanning means and being operative to photoelectrically convert light projected onto said image pickup means into an electrical output composed of successive signals corresponding to the intensities of light successively encountered by said scanning means in a line scanning direction, and means for projecting onto said image pickup means an image of the object to be televised, which image is divided into color components arranged side-by-side in said scanning direction to produce in said output respective color component signals of the same frequency band and a predetermined color subcarrier frequency; the improvement comprising means to project onto said image pickup means index images which, when encountered in said line scanning direction, produce in said output amplitude modulated index signals having a carrier frequency greater than said color subcarrier frequency and a frequency band different from said frequency band of the color component signals, and means differentiating between said color component signals corresponding to the respective color components by means of said index signals and being operative to extract color component signals from said output of the image pickup means.

16. A color video signal generating apparatus according to claim 15, in which said means to project index images is interposed optically between said object to be televised and said image pickup means and includes a series of transparent and nontransparent regions arranged in alternating, side-by-side relationship in said line scanning direction and having respective dimensions measured at right angles to said direction which charge gradually from region to region in said direction, whereby to gradually change the amplitudes of the index signals which result from the images formed by light passing through said transparent regions.

17. A color video signal generating apparatus according to claim 16, in which said transparent and nontransparent regions are of uniform widths in said line scanning direction so that said index signals are of constant frequency.

18. A color video signal generating apparatus according to claim 16, in which said dimensions of said series of regions progressively increase and then decrease in said line scanning direction, and said means to project index images further include transparent areas extending along said series and having dimensions at right angles to said line scanning direction which progressively decrease and then increase oppositely to said dimensions of said series of regions so that light passing through said transparent areas provides a constant DC level for the carrier of said index signals and the direction of change of the amplitude of said index signals is alternately reversed to either side of said DC level.